(12) United States Patent
Christ et al.

(10) Patent No.: US 10,486,740 B2
(45) Date of Patent: Nov. 26, 2019

(54) STEERING SAFETY DEVICE

(71) Applicant: SAF-HOLLAND GmbH, Bessenbach (DE)

(72) Inventors: Armin Christ, Bessenbach (DE); Peter Ziegler, Riegel (DE)

(73) Assignee: SAF-HOLLAND GmbH, Bessenbach (DE)

(*) Notice: Subject to any disclaimer, the term of this patent is extended or adjusted under 35 U.S.C. 154(b) by 72 days.

(21) Appl. No.: 15/574,742

(22) PCT Filed: May 25, 2016

(86) PCT No.: PCT/EP2016/061788
§ 371 (c)(1),
(2) Date: Nov. 16, 2017

(87) PCT Pub. No.: WO2016/193091
PCT Pub. Date: Dec. 8, 2016

(65) Prior Publication Data
US 2018/0148090 A1 May 31, 2018

(30) Foreign Application Priority Data
May 29, 2015 (DE) .......... 10 2015 108 520

(51) Int. Cl.
*B62D 7/14* (2006.01)
(52) U.S. Cl.
CPC .......... *B62D 7/148* (2013.01); *B62D 7/144* (2013.01)

(58) Field of Classification Search
CPC ....... B62D 7/148; B60B 33/02; B60B 33/026; B60B 33/028
See application file for complete search history.

(56) References Cited

U.S. PATENT DOCUMENTS

| 4,702,333 A * | 10/1987 | Lippert ............. B62D 5/06 180/414 |
| 4,770,264 A * | 9/1988 | Wright ............. B62D 7/148 180/415 |
| 4,893,825 A * | 1/1990 | Janson ............. B62D 7/15 180/415 |
| 6,067,871 A * | 5/2000 | Markyvech ......... F16H 61/24 74/335 |

(Continued)

FOREIGN PATENT DOCUMENTS

| CN | 101941460 | 1/2011 |
| CN | 103085862 | 5/2013 |

(Continued)

OTHER PUBLICATIONS

European Patent Office; International Search Report; dated Aug. 3, 2016.

*Primary Examiner* — Kevin Hurley
(74) *Attorney, Agent, or Firm* — Price Heneveld LLP

(57) ABSTRACT

A steering securing arrangement includes comprising a rod, a housing and a blocking unit, the rod being guided on the housing along an actuating axis, the blocking unit configured to be moved into a first state, in which the blocking unit is out of engagement with the rod, the blocking unit being further configured to be moved into a second state, in which the blocking unit is in engagement with the rod and secures the rod against movement along the actuating axis.

25 Claims, 3 Drawing Sheets

(56) References Cited

U.S. PATENT DOCUMENTS

| | | | |
|---|---|---|---|
| 6,086,074 A | 7/2000 | Braun | |
| 7,401,677 B2 * | 7/2008 | Boyle | B62D 7/148 180/400 |
| 8,672,084 B2 * | 3/2014 | Watanabe | B62D 6/02 180/408 |
| 9,932,063 B2 * | 4/2018 | Schnug | B62D 3/12 |
| 2010/0259023 A1 * | 10/2010 | Cebon | B62D 7/144 280/89 |
| 2012/0319374 A1 | 12/2012 | Watanabe | |
| 2013/0340563 A1 * | 12/2013 | Yamanaka | B62D 7/148 74/533 |

FOREIGN PATENT DOCUMENTS

| | | |
|---|---|---|
| DE | 4111799 | 10/1922 |
| EP | 0225773 | 11/1986 |
| EP | 2537733 | 12/2012 |
| EP | 2676868 | 12/2013 |
| JP | H0357775 | 3/1991 |
| JP | H0357777 | 3/1991 |
| JP | H03114976 | 5/1991 |
| WO | 8907065 | 8/1989 |
| WO | 2008040957 | 10/2008 |

\* cited by examiner

STEERING SAFETY DEVICE

BACKGROUND OF THE INVENTION

The present invention relates to a steering securing means, in particular for use in commercial vehicles.

Steering securing means are known from the prior art. For instance, securing means are required, in particular, in steering axle systems, which securing means prevent a steering movement of a self-steering axle or another actively or passively steered axle during the reverse driving of the commercial vehicle or during a system failure of the hydraulics. Here, safety or securing systems have caught on which are arranged on the components of the steering system which move with respect to one another, and prevent a steering movement of the steering system mechanically or hydraulically. Here, said securing systems are fixed on the steering system on the outside. Here, the steering systems which are known from the prior art are not only very heavy, but they also take up an excessively large proportion of the available installation space in the chassis region. Moreover, they are susceptible to particles which are stirred up, and can be blocked by way of deposits during use of the commercial vehicle and can thus become non-functional.

It is an object of the present invention to provide a steering securing means which is of particularly compact configuration, makes a weight saving possible, and nevertheless affords sufficient safety against unintended steering movements.

SUMMARY OF THE INVENTION

According to the invention, the steering securing means comprises a rod, a housing and a blocking unit, the rod being guided on the housing along an actuating axis, it being possible for the blocking unit to be moved into a first state, in which it is out of engagement with the rod, it being possible for the blocking unit to be moved into a second state, in which it is in engagement with the rod and secures the rod against movement relative to the actuating axis. Here, the essential components of the steering securing means (rod, housing and blocking unit) are preferably integral constituent parts of a steering system of the commercial vehicle. The rod is thus preferably the track rod or the steering rod of an actively steered or passively steered commercial vehicle wheel suspension system. The housing is particularly preferably the housing of a hydraulic cylinder or pneumatically operated cylinder. The blocking unit is preferably fixed on the housing and is in direct engagement with the rod in its second state. This ensures a particularly compact overall design of the steering securing means, since the steering securing means utilizes components of the commercial vehicle wheel suspension system which are already present and therefore has only a low additional installation space requirement with respect to a steering axle without a steering securing means. Here, the blocking unit preferably has substantially two states, said blocking unit being out of engagement with the rod in a first state, a movement of the rod along an actuating axis being possible. In a second state, the blocking unit is designed to secure the rod against movement along the actuating axis. Here, a movement of the rod along the actuating axis preferably means a movement relative to the housing or movement relative to the frame of the commercial vehicle, which movement results in a steering movement of the wheels of the commercial vehicle. In the second state when the blocking unit is in engagement with the rod, a steering movement of the wheels of the commercial vehicle is therefore prevented. The rod is preferably guided along the actuating axis on the housing, which means in other words that a movement transversely with respect to the actuating axis is preferably prevented by way of the housing. A neutral position of the rod is advantageously defined, in which neutral position the rod can be held by way of the blocking unit. Here, the neutral position of the rod is particularly preferably the position of the rod along the actuating axis during straight-ahead driving of the steerable wheels of the commercial vehicle. The blocking unit is advantageously integrated directly onto or into the housing in such a way that only a very small installation space requirement is necessary for the blocking unit. Furthermore, the contact region between the blocking unit and the rod is advantageously protected by way of the housing of the steering securing means against the action of dirt and similar environmental influences.

The rod preferably has an engagement section, the blocking unit having a blocking element, the blocking element forming, in the second state of the blocking unit, an undercut with the engagement section or for the engagement section or for the rod, which undercut acts parallel to the actuating axis. The engagement section on the rod is preferably configured as a projection or as a recess and is designed to form an undercut with a blocking element of the blocking unit, which undercut acts parallel to the actuating axis. In this way, the engagement of the blocking element with the engagement section of the rod in the second state of the blocking unit can prevent the rod from moving parallel to or along the actuating axis relative to the blocking element. Furthermore, the blocking element is preferably secured against movement along the actuating axis or parallel to the actuating axis relative to the housing and/or relative to the fixed components of the frame of a commercial vehicle. In this way, the blocking element secures the rod against movement in such a way that a steering movement is ruled out. The undercut between the blocking element and the engagement section preferably acts parallel to the actuating axis in both directions.

The blocking element particularly preferably has a holding section, with which a holding means can be brought into engagement, in order to space the blocking element apart from the rod and to hold the blocking unit in the first state. The holding means is preferably a component or a medium which is designed to keep the blocking element away from the rod and, in particular, away from the positively locking engagement of the blocking element with the rod. Here, the holding means is preferably compressed air, hydraulic fluid or, for example, a piezoelectric element. As long as the holding means is therefore available in the steering securing means in such a way that it prevents an engagement between the blocking element and the rod, a steering movement of the commercial vehicle wheel suspension system is possible. The blocking element can be moved into its second state, in which it passes into engagement with the engagement section of the rod and prevents a steering movement, only if the holding means is released in this way from an engagement with the holding section of the blocking element as a result of a system failure or as a result of a controlled, intentional switching operation, for example during reverse driving of the commercial vehicle. In the case of a holding means which is configured as compressed air, this is, in particular, the reduction of the pressure in the compressed air and, in the case of a hydraulic fluid as holding means, this is, in particular, the outflow of the hydraulic fluid from the space which corresponds with the holding section and, in the case of a piezoelectric element, this is, in particular, the switch-off of a voltage which prevails on the piezoelectric element. In one particularly preferred embodiment, the holding means can also be a part of the hydraulic system which also causes or carries out the movement or the steering movement of the rod in the housing. At the moment, at which the hydraulic system fails and the pressure drops both in the housing and on the holding section, the blocking element can automatically pass into engagement with the engagement section of the rod, and a system failure of the hydraulic system therefore directly results in blocking of the steering system, preferably in the neutral position.

The blocking element can preferably be moved along a blocking axis relative to the rod, and is secured transversely with respect to the blocking axis against movement relative to the housing, the blocking axis lying transversely with respect to the actuating axis. In particular, the blocking unit preferably has a guide for the blocking element, which guide permits a movement of the blocking element relative to the remaining components of the blocking unit merely along a blocking axis. Here, the blocking axis is preferably oriented transversely with respect to the actuating axis. Here, the blocking axis is particularly preferably oriented precisely perpendicularly or orthogonally with respect to the actuating axis. It goes without saying in this context that the geometry of the blocking unit which prevents a movement of the blocking element transversely with respect to the blocking axis also absorbs the force which is transmitted from the rod to the blocking element parallel to the actuating axis or along the actuating axis. A corresponding guide geometry of the housing of the steering securing means can also particularly preferably prevent a movement of the blocking element along the actuating axis or transversely with respect to the blocking axis. In this preferred case, part of the blocking unit is preferably configured in one piece with the housing.

The blocking unit preferably has a blocking carrier which can be fixed or is fixed on the housing, a restoring means acting on the blocking carrier or being supported on it, which restoring means sets the blocking unit into the second state in the case of relief. Here, the blocking carrier of the blocking unit particularly preferably assumes the guidance of the blocking element. Furthermore, the blocking carrier preferably has a geometry, on which a restoring means can be supported, in order to exert a restoring force on the blocking element, which restoring force moves the blocking element into the second state. The restoring means is therefore particularly preferably prestressed in the first state of the blocking unit. The balance of forces between the above-described holding means and the restoring means therefore ensures a movement of the blocking element into the first state or into the second state. Here, the restoring means can preferably be compressed air or an elastically deformable body. The advantage of a compressed air system is that the force can be applied to the blocking element in a targeted manner and only at selected times by means of a controller, in order to move said blocking element into the second position. It can be carried out with sufficient safety by means of a hydraulic or compressed air circuit which functions independently of the steering hydraulics. Here, in particular, metallic springs, such as leaf springs or spiral springs, or those made from an elastically greatly deformable rubber material are used as elastic body. In the case of the use of a simple, elastically deformable body, it is advantageous that no further hydraulic or compressed air system has to be provided and regulated, which makes the steering securing means simple, inexpensive and reliable.

The blocking unit preferably passes into the second state if the force which is transmitted to the blocking element by the restoring means exceeds the force which is transmitted to the blocking element by the holding means. It is particularly preferred here that the restoring means acts on the blocking element in each case with a constant restoring force or prestressing force, and exceeds the force of the restoring means only when the force of the holding means is reduced, in such a way that the blocking element is moved in the direction of the rod, in order to move the blocking unit into its second state. It is preferred here that the restoring means is designed in such a way that the force which can be applied by it is sufficient to hold the blocking element in positively locking engagement with the rod, but is secondly small enough to be neutralized by way of the holding means, so as to hold the blocking element out of engagement with the rod when steering movements of the rod are desired.

The blocking carrier particularly preferably has a blocking housing and a cover. Here, the blocking housing can be part of a pneumatic cylinder, the blocking element at the same time having a piston which is preferably pressed away from the rod by way of air pressure. The restoring means which is supported on the blocking housing and/or on the cover of the blocking carrier preferably acts on that side of the blocking element which lies opposite the compressed air. A configuration of the blocking carrier comprising the blocking housing and the cover makes particularly simple assembly possible, since firstly all movable parts such as the blocking element and the restoring means can be inserted into the blocking housing, and the cover is subsequently placed onto it and can be fixed on the blocking housing in a positively locking, non-positive and/or integrally joined manner. Here, in particular, the blocking housing can preferably be configured in one piece with the housing of the steering securing means.

In particular, the blocking carrier can preferably be fixed or be capable of being fixed on the housing via a thread and/or in an integrally joined manner. As an alternative to the single-piece configuration of the blocking carrier with the housing of the steering securing means, it is preferred that the blocking unit can be preassembled as a separate module, and the blocking carrier of the blocking unit can subsequently be fixed on the housing via a thread. As an alternative or in addition to the positively locking and non-positive fixing of the blocking carrier on the housing of the steering securing means, the blocking carrier can also be welded fixedly on the housing of the steering securing means. The advantage of a welded connection is the more stable fixing of the blocking unit on the housing. The disadvantage of a welded connection in comparison with fixing by way of a thread or another positively locking connection is the lack of a dismantling capability.

As an alternative, the blocking carrier is preferably configured at least in sections in one piece with the housing. Here, in particular, that part of the blocking carrier which is configured as a cylinder is preferably configured in one piece with the housing. Here, the cylindrical part of the blocking carrier is preferably produced as a single-piece cast part together with the housing of the steering securing means. Particularly simple assembly of the steering securing means can be established in this way, since only a few components have to be assembled, in order to assemble the steering securing means. Moreover, the strength of the connection between the blocking unit and the housing is advantageously substantially stronger than if the blocking housing were screwed into the housing of the steering securing means. Here, in particular, there is also not the risk that the blocking carrier and therefore the blocking unit is released from the housing as a result of vibrations on the steering securing means. It is preferred in this embodiment that the cover of the blocking housing can be screwed into the blocking housing which is connected in one piece to the housing of the steering securing means. Here, the restoring means is preferably supported on the cover. In this way, as an assembly sequence, the blocking element can first of all be inserted into the blocking housing, subsequently the restoring means, and finally the cover can be screwed onto the blocking housing, the restoring means being prestressed against the blocking element.

In a further preferred embodiment, the engagement section is configured as a recess, the engagement section preferably having a chamfer region, and the chamfer region lying obliquely with respect to the actuating axis. The engagement section of the rod is preferably configured as a recess, which expediently comprises an engagement section of rotationally symmetrical configuration in a first embodiment. As an alternative, the engagement section can preferably be provided only on one side of the rod. In this case, the rod is secured, in particular, against rotation about the actuating axis. Furthermore, the engagement section preferably has a chamfer region which is, in other words, a beveled portion of the engagement section. Said chamfer region facilitates the sliding of the rod into a secured position when the blocking unit is situated in its second state. When, in particular, the second state of the blocking unit is triggered when the steering system of the commercial vehicle is not yet situated in the neutral position, the blocking unit, in particular the blocking element, will first of all come into contact in a region of the rod which lies outside the engagement section. In order that the blocking element can pass into engagement with the engagement section in a simple way when the rod moves along the actuating axis further in the direction, in which the neutral position is reached, the chamfer region is provided, in order to permit gradual sliding of the blocking element into the engagement section. In particular, an angle of from approximately 20 to 70° with respect to the actuating axis, as viewed in each case in a sectional view parallel to the pivoting axis or in a side view orthogonally with respect to the pivoting axis, is preferably defined as a position of the chamfer region obliquely with respect to the actuating axis.

Furthermore, the engagement section preferably has a locking region, the locking region lying at least in regions perpendicularly with respect to the actuating axis. The actuating region serves, in particular, to hold the blocking element in engagement with the engagement section. For this purpose, the locking region preferably has two flanks which are oriented substantially perpendicularly with respect to the actuating axis, form an undercut with the blocking element, and prevent it from being possible for the blocking element to pass out of engagement with the engagement section again solely by way of a movement of the rod along the actuating axis with a high force. The locking region of the engagement section therefore ensures that the blocking element can be moved out of engagement with the engagement section of the rod in an active manner, that is to say by way of the application of a force which counteracts the force of the restoring means. In particular, the locking region of the engagement section is preferably of substantially rectangular configuration in the side view or in the sectional view.

In particular, the housing is preferably configured as a hydraulic cylinder, it being possible for a piston to be fixed on the rod, which piston transmits a force along the actuating axis to the rod in a manner which is operated hydraulically or pneumatically. In particular, the housing of the steering securing means is preferably not provided solely as a guide of the rod, but rather is at the same time also configured as a hydraulic cylinder, the rod having a piston which is correspondingly in interaction with the hydraulic cylinder. In this way, an integration of the function of a hydraulic cylinder with the function of a steering securing means can be performed within the context of the present invention. As a result, in particular, the installation space requirement and the weight of the chassis of the commercial vehicle are reduced.

In a first preferred embodiment, two pistons are fixed on the rod, the engagement region being arranged between the pistons on the rod. In particular, the hydraulic cylinder therefore preferably has two chambers which are spaced apart spatially from one another by way of in each case two pistons, the engagement section and therefore also the region, in which the blocking unit protrudes into the housing of the hydraulic cylinder, being provided in a region between the two pistons. The advantage of said embodiment is that the region, in which the blocking unit passes into engagement with the rod, can be kept free from hydraulic fluid, since the two pistons in each case seal the engagement region of the rod against hydraulic fluid. It goes without saying that, as an alternative to hydraulic fluid, compressed air can also be used in the embodiment which is described here.

In particular, the housing preferably has two connectors, via which a fluid can be introduced into the housing and can be discharged from the housing. The housing which is designed as a hydraulic or pneumatic cylinder is therefore configured as a double-acting cylinder. In other words, this means that the housing which is designed as a double-acting cylinder can transmit a force in the two possible directions along the actuating axis to the rod via the respective pressurization of one of the two chambers.

In an alternative embodiment, the rod has only one piston, it being possible by way of said embodiment, in particular, for installation space and weight to be saved in the steering securing means. For this purpose, however, improved seals of the blocking unit against the entry of compressed air or hydraulic fluid from the housing are necessary.

The rod is preferably the track rod of a steering system, the blocking unit acting directly on the rod in its second state. In other words, no further components are therefore necessary on the rod or on the housing of a steering cylinder of a commercial vehicle, in order to achieve corresponding security against steering movements in the case of a system failure or during reverse driving of the commercial vehicle. In particular, weight and the installation space requirement can be reduced in this way.

BRIEF DESCRIPTION OF THE DRAWINGS

Further advantages and features of the present invention result from the following description with reference to the appended figures. It goes without saying here that features which are disclosed only in one of the figures or one of the embodiments can also be used in other embodiments, if this is not ruled out explicitly or on account of technical conditions. In the figures.

DETAILED DESCRIPTION OF THE PREFERRED EMBODIMENTS

Figure 1:
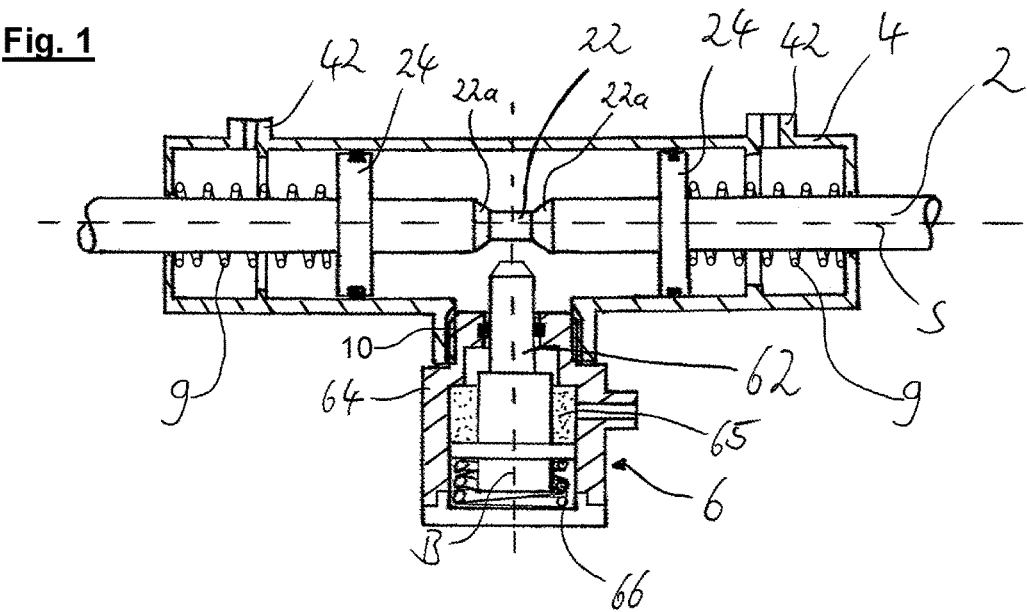
FIG. 1 shows a partially sectioned view of a first embodiment of the steering securing means according to the invention.

In the preferred embodiment of the steering securing means which is shown in FIG. 1, a rod 2 is guided such that it can be moved along an actuating axis S in a housing 4. The rod 2 preferably has two pistons 24 which, provided with seals, can slide in a fluid-tight manner along the actuating axis S in the cavity which is formed by the housing 4. The housing 4 preferably has two connectors 42, via which a pressure medium, for example hydraulic fluid or compressed air, can be introduced into the pressure chambers, which lie in each case on the right or left of the pistons 24, and can be discharged from said pressure chambers again. The connectors 42 are spaced apart from one another and are preferably arranged in the vicinity of the end walls of the housing 4. The housing 4 and the rod 2 with the pistons 24 are therefore configured as a double-acting hydraulic cylinder. Stops for the piston or pistons 24 are provided adjacently with respect to the connectors 42, in order that said piston or pistons 24 cannot move past the connectors 42. Although said stops are not explicitly mentioned in FIGS. 2 and 3, they are also preferably present in the embodiments which are shown there. A blocking unit 6 is preferably fixed on the housing 4 via a thread 10. The blocking unit 6 has a blocking carrier 64 and a blocking element 62. The blocking element 62 is guided in the blocking carrier 64 in such a way that it can carry out only a movement along a blocking axis B. On its side which faces away from the rod 2, the blocking element 62 has a holding section 63, on the one side of which a restoring means 66 acts, and on the other side of which a holding means 65 is provided. The holding means 65 is preferably compressed air which has been filled into the pressure chamber of the blocking carrier 64, which pressure chamber is configured as a cylinder. As an alternative to this, the holding means 65 can also be configured as a piezoelectric element, as shown in FIG. 3. Here, FIG. 1 shows the blocking unit 6 in its first state, in which the blocking element 62 is out of engagement with the rod 2, in particular with the engagement section 22 of the rod 2. In said first state of the blocking unit 6, the force which is transmitted to the holding section 63 by the holding means 65 exceeds the force which is transmitted to the holding section 63 by the restoring means 66. Furthermore, FIG. 1 shows that the engagement section 22 of the rod 2 has two chamfer regions 22a. The chamfer regions 22a preferably correspond, in particular, with the blocking element 62 in such a way that the latter can be brought more easily into positively locking engagement with the engagement section 22 by way of a movement of the rod 2 along the actuating axis S. Two spring elements 9 which are arranged in each case between a side of the piston 24 and the end wall of the housing 4 are preferably provided in order to assist the restoring of the rod 2 into the neutral position. The spring elements 9 generate in each case a force which acts along the actuating axis S and prestresses the piston 24 (FIG. 3) or the pistons 24 (FIGS. 1, 2 and 5) in the direction of the neutral position of the rod 2. Although the spring elements 9 are shown only in FIG. 1, they are also advantageously arranged between the housing 4 and the piston or pistons 24 in the embodiments of FIGS. 2, 3 and 5. The spring elements 9 assist the restoring of the rod 2 into the neutral position relative to the housing 4, and thus ensure for all embodiments within the context of the present invention that, in the case of a system failure, rapid restoring of the steering system into the straight-ahead driving position takes place, in which straight-ahead position the blocking unit 6 subsequently secures the rod 2.

Figure 2:
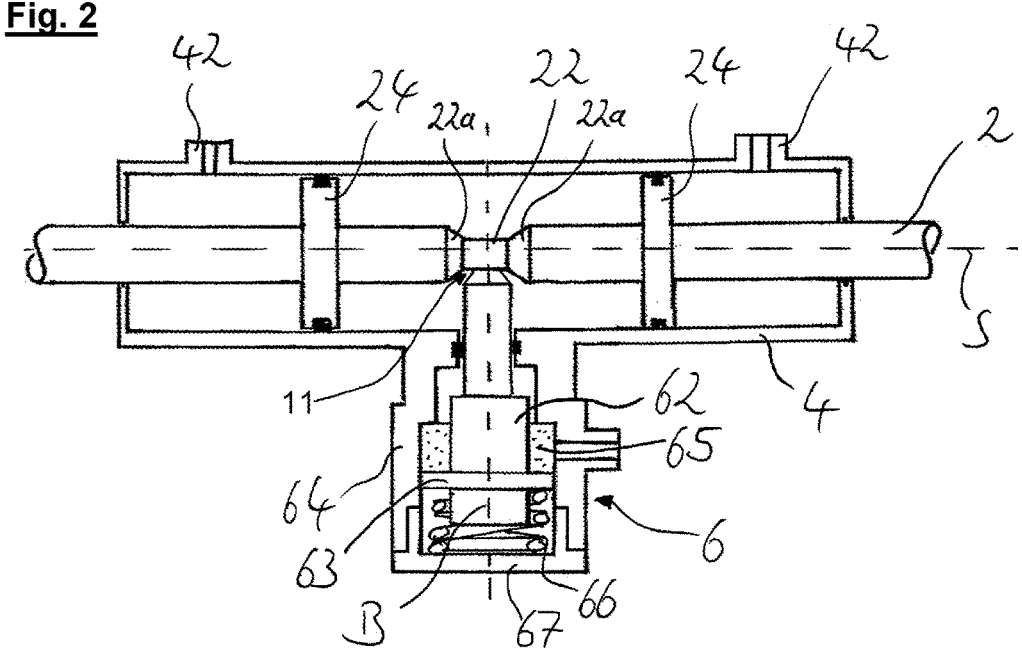
FIG. 2 shows a view of the embodiment of the steering securing means which is shown in FIG. 1, in the second state.
Figure 3:
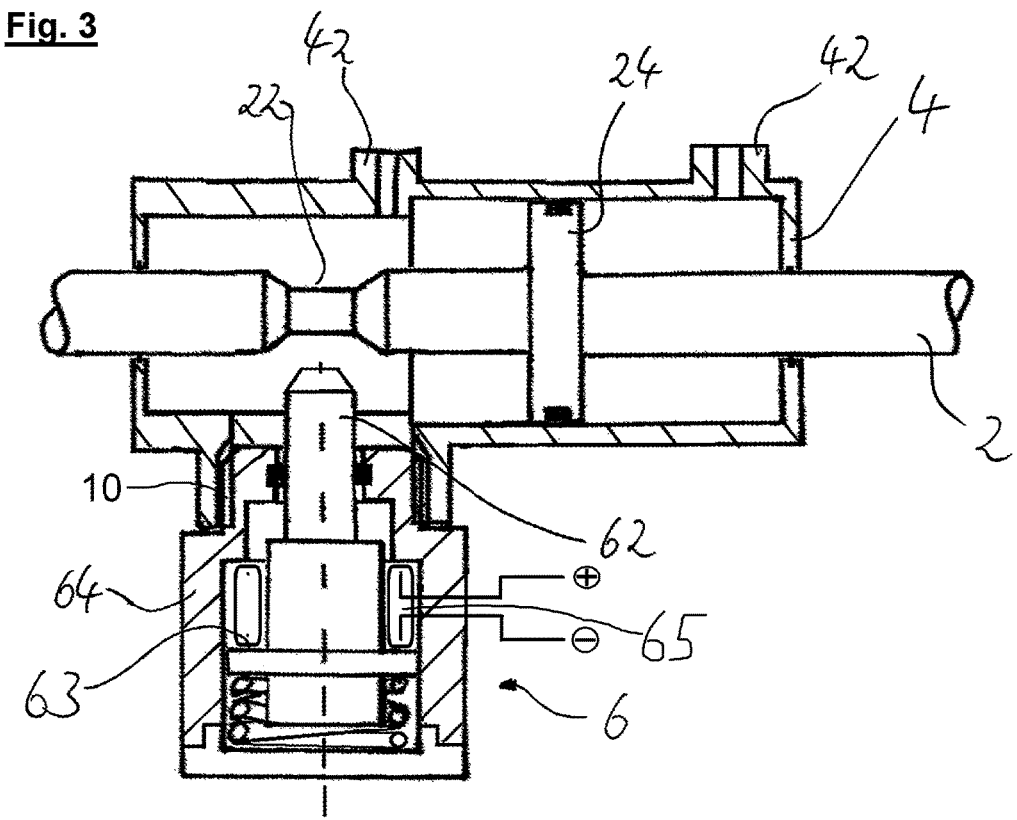
FIG. 3 shows a partially sectioned view of a further preferred embodiment of the steering securing means according to the invention.

FIG. 2 shows an embodiment of the steering securing means which is similar to the embodiment which is shown in FIG. 1, the blocking unit 6 being present in its second position. Furthermore, in the case of the embodiment which is shown in FIG. 2 in contrast to the variant which is shown in FIG. 1, the blocking carrier 64 is configured mostly in one piece with the housing 4. Only the cover 67 is screwed on here after the introduction of the blocking element 62 and the restoring means 66, which simplifies the assembly and ensures a high stability of the interface between the housing 4 and the blocking unit 6. It goes without saying that both the single-piece and the multiple-piece configuration of said interface can be used in all other variants of the invention which are shown here. In the second position of the blocking unit 6, the blocking element 62 is in engagement with an undercut 11 of the engagement section 22 of the rod 2. Here, in comparison to the first state which is shown in FIG. 1, the blocking element 62 has moved along the blocking axis B in the direction of the rod 2 and is now seated on the rod 2 in the engagement region 22. In this state, the force which is applied by the holding means 65 is preferably smaller than the force of the restoring means 66. Here, the holding means 65 is preferably coupled to the hydraulic or compressed air system of the entire steering system of the commercial vehicle, with the result that, in the case of a system failure in the hydraulic or compressed air system of the commercial vehicle, the pressure in the holding means 65 drops automatically, with the result that the restoring force of the restoring means 66 exceeds the force which is applied by the holding means 65 and finally moves the blocking element 62 in such a way that the blocking unit 6 is set into the second state. In the second state which is shown in FIG. 2, a displacement movement of the rod 2 along the actuating axis S relative to the housing 4 and to the blocking unit 6 is no longer possible. In order to set the steering securing means into the first state which is shown in FIG. 1 again, the pressure of the holding means 65 has to be increased, with the result that the force of the holding means 65 exceeds the restoring force of the restoring means 66 and finally the blocking element 62 can be brought out of engagement with the rod 2 again.

FIG. 3 shows an alternative embodiment, in which the rod 2 has only one piston 24. In said embodiment, the freedom of movement of the rod 2 along the actuating axis S within the housing 4 is delimited by way of stops, with the result that, in particular, the engagement region 22 cannot come into contact with the left-hand wall region of the housing. In this case, the seal of the connection comprising the housing 4 and the rod 2 would no longer be ensured. In the embodiment which is shown in FIG. 3, a substantially lower installation space for the steering securing means is required, in comparison with the embodiments which are shown in FIGS. 1 and 2. The blocking carrier 64 which is shown in FIG. 3 can preferably also be configured substantially in one piece with the housing 4 of the steering securing means, as shown in FIG. 2. The holding means 65 which is configured as a piezoelectric element preferably extends when a voltage is applied, the blocking element 62 being held in the first state. If the voltage drops below a defined value, the piezoelectric element contracts and the restoring means 66 moves the blocking element 62 into the second position. Furthermore, a pressurized fluid can preferably be used instead of the holding means 65 which is configured as a piezoelectric element, as disclosed in FIGS. 1 and 2.

Figure 4:
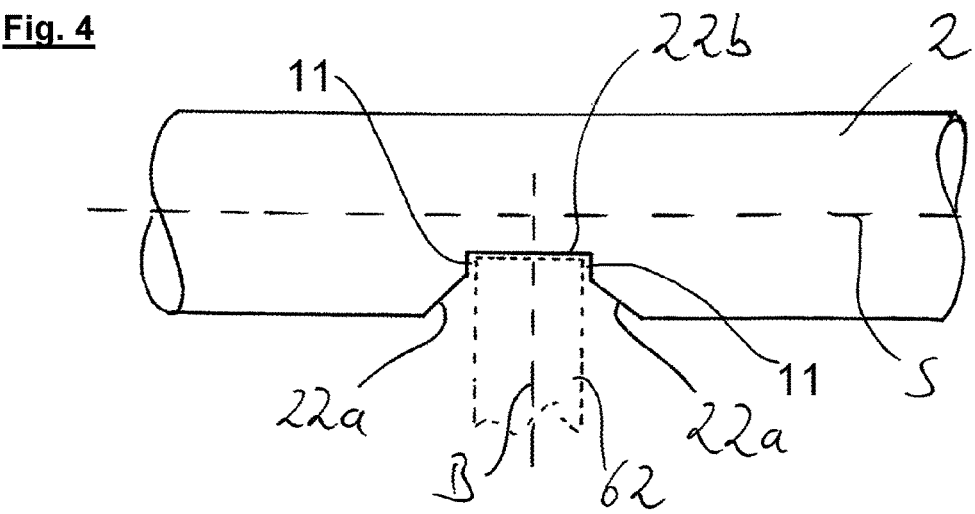
FIG. 4 shows a view of one preferred embodiment of the rod according to the invention.

FIG. 4 shows one preferred embodiment of the rod 2, the engagement region 22 of the rod 2 having chamfer regions 22a and a locking region 22b. As an alternative to said embodiment which is shown, the engagement section 22 can also only have a locking region 22b and no chamfer regions 22a. An object of the locking region 22b is, in particular, secure holding of the blocking element (shown using dashed lines) in the second position, with the result that the rod is secured with high security against movement relative to or along the actuating axis S. In order to permit a steering movement of the rod 2 again, the blocking element 62 has to be moved along the blocking axis B out of engagement with the engagement section 22, in particular with the locking region 22b of the engagement section 22.

Figure 5:
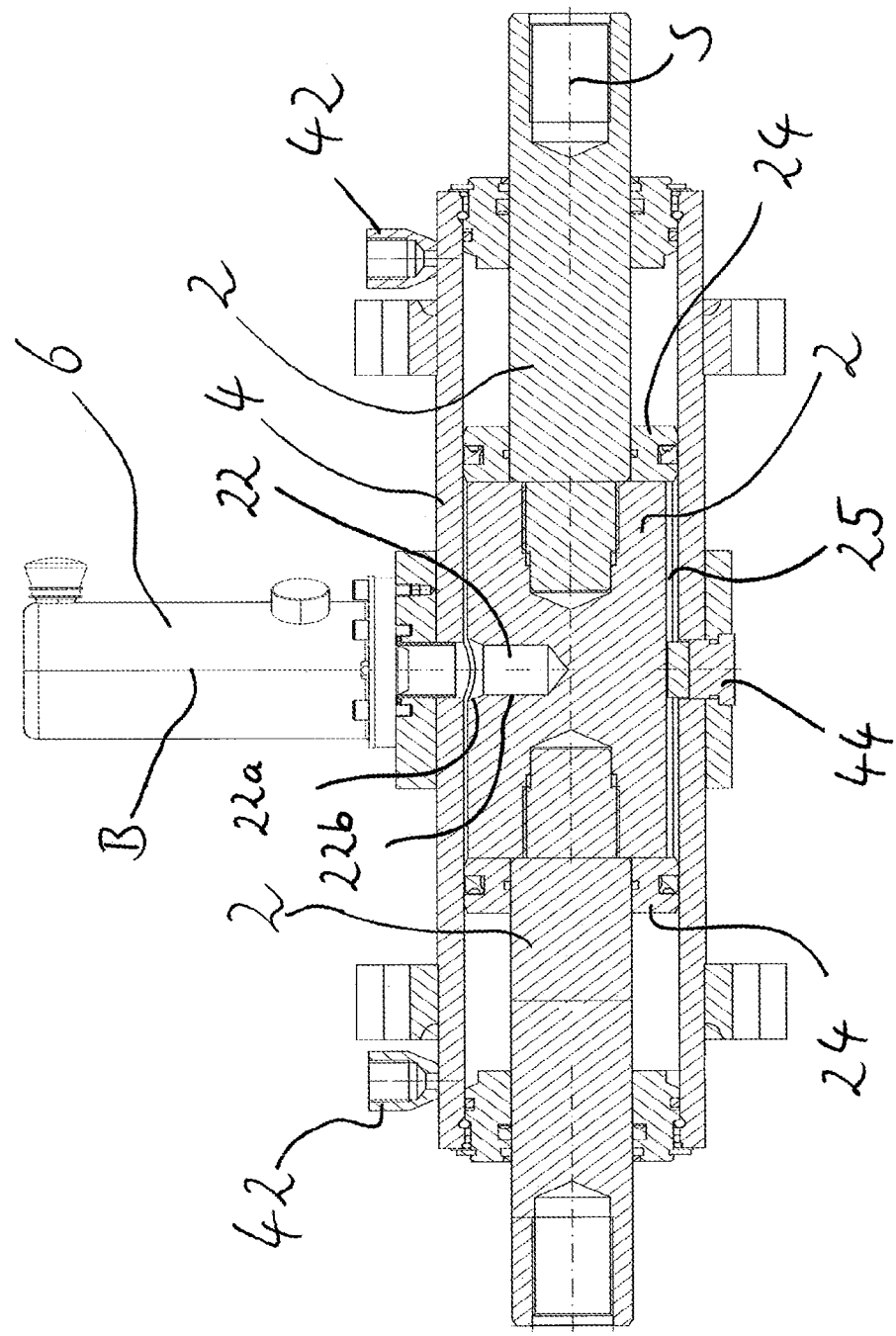
FIG. 5 shows a sectioned view of a further preferred embodiment of the steering securing means according to the invention.

FIG. 5 shows a further preferred embodiment of the steering securing means, in which the rod 2 is advantageously of multiple-piece configuration. Here, the multiple-piece rod 2 can be assembled more easily, the two outer rod sections which have a fastening geometry for fixing on the steering arms of the wheels of the commercial vehicle particularly preferably being screwed into the inner rod section which comprises the engagement section 22 and the pistons 24. Furthermore, the rod 2 has a guide section 25, into which a guide element 44 engages in order to secure the rod 2 against rotation about the actuating axis S relative to the housing 4. The guide element 44 and the corresponding guide section 25 can also preferably be provided in the embodiments of FIGS. 1-4. In the preferred embodiment which is shown in FIG. 5, the guide element 44 is a threaded pin which engages into the guide section 25 which is configured as a longitudinal groove. In particular in the embodiments of FIGS. 4 and 5, in which the engagement section 22 is not of rotationally symmetrical configuration about the pivoting axis S, the anti-rotation safeguard of the rod 2 ensures the constantly correct orientation of the rod 2 with respect to the housing 4 and the blocking unit 6 which is fixed on it.

LIST OF DESIGNATIONS

2 Rod
4 Housing
6 Blocking unit
9 Spring element
10 Thread
11 Undercut
22 Engagement section
22a Chamfer section
22b Locking region
24 Piston
25 Guide section
42 Connector
44 Guide element
62 Blocking element
63 Holding section
64 Blocking carrier
65 Holding means
66 Restoring means
S Actuating axis

The invention claimed is:

1. A steering securing arrangement, comprising:
a rod;
a housing; and
a blocking unit;
the rod being guided on the housing along an actuating axis;
the blocking unit configured to be brought into a first state in which the bearing unit is out of engagement with the rod;
the blocking unit configured to be brought into a second state in which the bearing unit is in engagement with the rod and secures the rod against movement along the actuating axis;
the rod having an engagement section;
the blocking unit having a blocking element;
the blocking element forming, in the second state of the blocking unit, an undercut with the engagement section, where the undercut acts parallel to the actuating axis;
the blocking element having a holding section on which a holding means can be brought into engagement, in order to space the blocking element apart from the rod and to hold the blocking unit in the first state;
the holding means including compressed air; and
the blocking unit including a blocking carrier fixed on the housing via a thread.

2. The steering securing arrangement as claimed in claim 1, the blocking element configured to be moved along a blocking axis relative to the rod, the blocking element being secured transversely with respect to the blocking axis against movement relative to the housing, and the blocking axis lying transversely with respect to the actuating axis.

3. The steering securing arrangement as claimed in claim 2, a restoring means acting on the blocking carrier, where the restoring means sets the blocking unit into the second state in the case of relief.

4. The steering securing arrangement as claimed in claim 3, wherein the restoring means includes compressed air.

5. The steering securing arrangement as claimed in claim 3, the blocking unit passing into the second state if the force which is transmitted to the blocking element by the restoring means exceeds the force which is transmitted to the blocking element by the holding means.

6. The steering securing arrangement as claimed in claim 5, the blocking carrier having a blocking housing and a cover.

7. The steering securing arrangement as claimed in claim 6, the blocking carrier configured to be fixed on the housing in an integrally joined manner.

8. The steering securing arrangement as claimed claim 7, the engagement section being configured as a recess, the engagement section having a chamfer region, and the chamfer region lying obliquely with respect to the actuating axis.

9. The steering securing arrangement as claimed in claim 8, the engagement section having a locking region, and the locking region lying at least in regions perpendicularly with respect to the actuating axis.

10. The steering securing arrangement as claimed in claim 9, the housing being configured as a hydraulic cylinder; and further comprising:
a piston configured to be fixed on the rod and transmit a force along the actuating axis to the rod in at least one of a hydraulically and pneumatically operated manner.

11. The steering securing arrangement as claimed in claim 10, wherein the piston is one of two pistons being fixed on the rod, the engagement region being arranged between the pistons on the rod.

12. The steering securing arrangement as claimed in claim 11, the housing having two connectors, via which a fluid can be introduced into the housing and can be discharged from the housing.

13. The steering securing arrangement as claimed in claim 12, the rod being the track rod of a steering system, and the blocking unit acting directly on the rod in the second state.

14. The steering securing arrangement as claimed in claim 1, a restoring means acting on the blocking carrier, where the restoring means sets the blocking unit into the second state in the case of relief.

15. The steering securing arrangement as claimed in claim 14, wherein the restoring means includes compressed air.

16. The steering securing arrangement as claimed in claim 14, the blocking unit passing into the second state if the force which is transmitted to the blocking element by the restoring means exceeds the force which is transmitted to the blocking element by the holding means.

17. The steering securing arrangement as claimed in claim 1, the blocking carrier having a blocking housing and a cover.

18. The steering securing arrangement as claimed in claim 14, the blocking carrier configured to be fixed on the housing in an integrally joined manner.

19. The steering securing arrangement as claimed claim 1, the engagement section being configured as a recess, the engagement section having a chamfer region, and the chamfer region lying obliquely with respect to the actuating axis.

20. The steering securing arrangement as claimed in claim 1, the engagement section having a locking region, and the locking region lying at least in regions perpendicularly with respect to the actuating axis.

21. The steering securing arrangement as claimed in claim 1, the housing being configured as a hydraulic cylinder; and further comprising:

a piston configured to be fixed on the rod and transmit a force along the actuating axis to the rod in at least one of a hydraulically and pneumatically operated manner.

22. The steering securing arrangement as claimed in claim 21, wherein the piston is one of two pistons being fixed on the rod, the engagement region being arranged between the pistons on the rod.

23. The steering securing arrangement as claimed in claim 1, the housing having two connectors, via which a fluid can be introduced into the housing and can be discharged from the housing.

24. The steering securing arrangement as claimed in claim 1, the rod being the track rod of a steering system, and the blocking unit acting directly on the rod in the second state.

25. A steering securing arrangement, comprising:
a rod;
a housing; and
a blocking unit;
the rod being guided on the housing along an actuating axis;
the blocking unit configured to be brought into a first state in which the bearing unit is out of engagement with the rod;
the blocking unit configured to be brought into a second state in which the bearing unit is in engagement with the rod and secures the rod against movement along the actuating axis;
the rod having an engagement section;
the blocking unit having a blocking element;
the blocking element forming, in the second state of the blocking unit, an undercut with the engagement section, where the undercut acts parallel to the actuating axis;
the blocking element having a holding section on which a holding means can be brought into engagement, in order to space the blocking element apart from the rod and to hold the blocking unit in the first state;
the holding means including a piezoelectric element; and
the blocking unit including a blocking carrier fixed on the housing via a thread.

* * * * *